US008003242B2

(12) United States Patent
Puhlick et al.

(10) Patent No.: US 8,003,242 B2
(45) Date of Patent: Aug. 23, 2011

(54) LIQUID RETAINING PRESSURE RELIEF VALVE FOR BATTERY CELLS

(75) Inventors: Alben F. Puhlick, Westerly, RI (US); Susan J. Russell, Pawcatuck, CT (US); James R. Dick, Pawcatuck, CT (US); Hartwell L. Gauthier, Jr., Plainfield, CT (US); Alexander P. Karpinski, North Stonington, CT (US)

(73) Assignee: Yardney Technical Products, Inc., Pawcatuck, CT (US)

( * ) Notice: Subject to any disclaimer, the term of this patent is extended or adjusted under 35 U.S.C. 154(b) by 0 days.

(21) Appl. No.: 11/085,714

(22) Filed: Mar. 18, 2005

(65) Prior Publication Data

US 2005/0208369 A1 Sep. 22, 2005

Related U.S. Application Data

(60) Provisional application No. 60/555,028, filed on Mar. 19, 2004.

(51) Int. Cl.
*H01M 2/12* (2006.01)
(52) U.S. Cl. ............... 429/82; 429/77; 429/78; 429/83; 429/84; 429/85; 429/86

(58) Field of Classification Search ............ 429/77, 429/78, 82, 83, 84, 85, 86
See application file for complete search history.

(56) References Cited

U.S. PATENT DOCUMENTS

| 5,217,823 | A  | * | 6/1993 | Geibl et al. | 429/55 |
| 6,051,332 | A  | * | 4/2000 | Verhoog et al. | 429/54 |
| 6,180,286 | B1 | * | 1/2001 | Rao et al. | 429/245 |
| 6,368,741 | B1 | * | 4/2002 | Hackel et al. | 429/53 |
| 6,949,310 | B2 | * | 9/2005 | Phillips | 429/53 |

* cited by examiner

*Primary Examiner* — Patrick Ryan
*Assistant Examiner* — Ben Lewis
(74) *Attorney, Agent, or Firm* — Cantor Colburn LLP

(57) ABSTRACT

A liquid retaining pressure relief valve for electrochemical battery cells is provided including a pressure regulator and a membrane vent that are mounted to the top and bottom ends of a threaded valve housing or plug. The valve housing or plug screws into the cell cover from the outside of the cell such that the membrane vent is internal to the cell. The membrane vent includes a thin gas permeable liquid repellant membrane that is molded into the body of the vent. The membrane is preferably composed of an expanded polytetraflouroethylene (ePTFE) polymer.

17 Claims, 3 Drawing Sheets

LIQUID RETAINING PRESSURE RELIEF VALVE

LIQUID RETAINING PRESSURE RELIEF VALVE FOR BATTERY CELLS

PRIORITY

This invention claims the benefit of provisional application Ser. No. 60/555,028, filed on Mar. 19, 2004.

FIELD OF THE INVENTION

This invention relates to a liquid retaining pressure relief valve for use in electrochemical battery cells employing liquid electrolytes and particularly alkaline electrolytes such as silver-zinc alkaline cells.

BACKGROUND OF THE INVENTION

The electrolyte used in an electrochemical battery cell is either alkaline, such as potassium hydroxide or sodium hydroxide, or acidic. During the anode or cathode electrochemical process that takes place in each cell, gasses are normally produced. These gasses consist mostly of hydrogen and oxygen and must be vented from the cell in order to prevent a high-pressure buildup inside the cell. In most silver-zinc alkaline cells, for example, the cell container or casing is fitted with a pressure regulator that vents gasses prior to excessive pressure build-up inside the cell.

An undesirable event that often occurs during the venting process is the escape of liquid electrolyte from inside the cell through the pressure regulator. This free electrolyte that escapes from the cell can create certain serious problems. For example, the electrolyte can produce unwanted electrode to battery case voltages or voltages between the cell electrodes within the battery. The normal method to prevent these undesired current paths is to place an absorbent material over the pressure regulator. Based on the available space within the battery cells, this is not always possible and cell short circuits have occurred in instances even where the absorbent material is used.

It is therefore an important object of this invention to provide a pressure relief valve that vents gasses while retaining the liquid electrolyte inside the cell.

SUMMARY OF THE INVENTION

According to the invention, there is provided a novel and improved liquid retaining pressure relief valve for use in electrochemical battery cells comprising, in combination, a valve housing including a gas passageway extending between opposite ends thereof, a pressure regulator assembly sealably mounted in one of the opposite ends of the housing for venting to the ambient atmosphere gasses passing through the gas passageway, and a membrane vent assembly sealably mounted in the other opposite end of the valve body for directing gasses into the gas passageway from the interior of the battery cell, the vent assembly including a gas permeable liquid repellant membrane positioned inside the vent for retaining any liquid electrolyte entering the vent along with the gasses from the interior of the cell upon opening of the pressure regulator.

In a preferred embodiment of the liquid retaining pressure relief valve, the pressure regulator assembly is of the blatter type using an elastomer band covering two venting holes in the upper end of the regulator body and the membrane vent assembly consists of six radially disposed channels communicating between the lower end of the gas passageway and the interior of the battery cell.

The gas permeable liquid repellant membrane used in the pressure relief valve of the invention is preferably a thin disc made of an expanded polytetraflouroethylene (ePTFE) polymer and is positioned between the venting channels and the gas passageway leading to the pressure regulator.

The body of the pressure regulator is threadably mounted inside the upper end of the pressure relief valve housing and is gas tightly sealed thereto by an O-ring. In a similar fashion, the membrane vent is threadably mounted inside the lower end of the pressure relief valve housing and is gas tightly sealed thereto by another O-ring.

The pressure relief valve housing of the invention is provided with a series of threads on its exterior surface and is mounted through a threaded opening in the battery cell cover also using an O-ring to insure a good seal. The liquid retaining pressure relief valve of the invention is designed to be installed as a whole assembled unit within a battery cell with the liquid repellant membrane internal to the cell. Since the cell cover in most cells are normally permanently sealed to the cell container, it is an important feature of this invention that the pressure relief valve can be installed from the outside of the cell to allow filling of the cell with electrolyte and also for maintaining the valve during its use.

DESCRIPTION OF THE PREFERRED EMBODIMENTS

Figure 1:
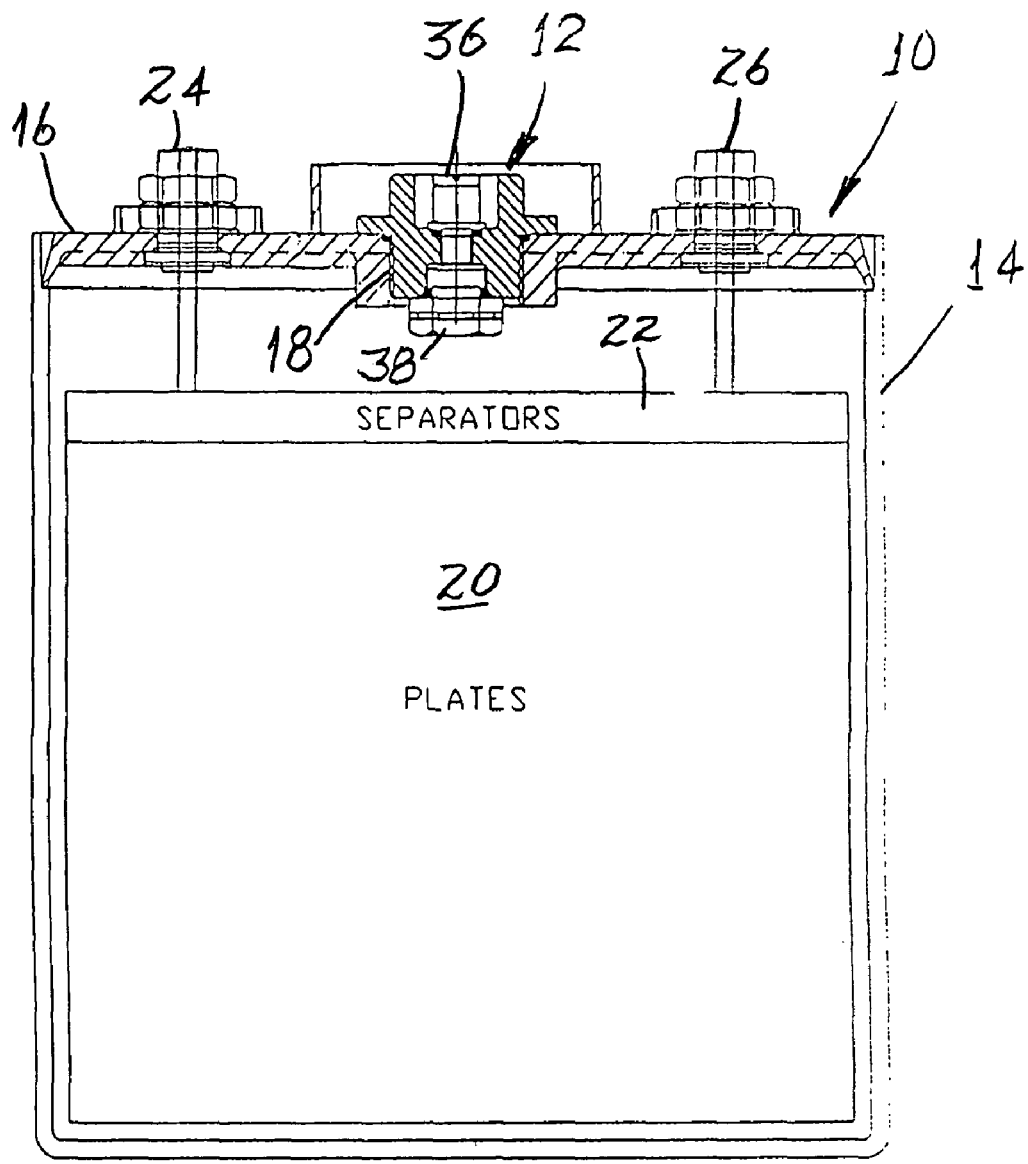
FIG. 1 is a vertical elevational cross-sectional view of a typical silver-zinc alkaline battery cell employing a liquid retaining pressure relief valve embodying the invention.

Referring now to the drawings, there is shown in FIG. 1 a typical silver-zinc alkaline battery cell 10 employing a preferred form of the liquid retaining pressure relief valve 12 according to the invention. The battery cell 10 comprises a cupped shaped molded plastic container or case 14 having a generally flat molded plastic cover 16 formed with a circular opening 18 at its center for installation of the liquid retaining pressure relief valve 12. Both the battery cell container 14 and the cover 16 may be made of most any plastic material that is resistant to corrosion by alkaline or acidic electrolyte solutions used in the cells.

The battery cell 10 further includes multiple positive and negative electrode plates, only one of which is shown at 20. The electrode plates are composed of silver and zinc, in the instance, and are separated from one another by a porous separator medium 22 containing an alkaline electrolyte, such as potassium hydroxide or sodium hydroxide. A pair of positive and negative battery terminals 24, 26 are provided within the cover 16, one on each side of the liquid retaining pressure relief valve 12. The positive terminal 24 is connected to each one of the positive electrode plates (silver) 20 while the negative terminal 26 is connected to each one of the negative electrode plates (not shown) inside the battery cell 10.

Figure 2:
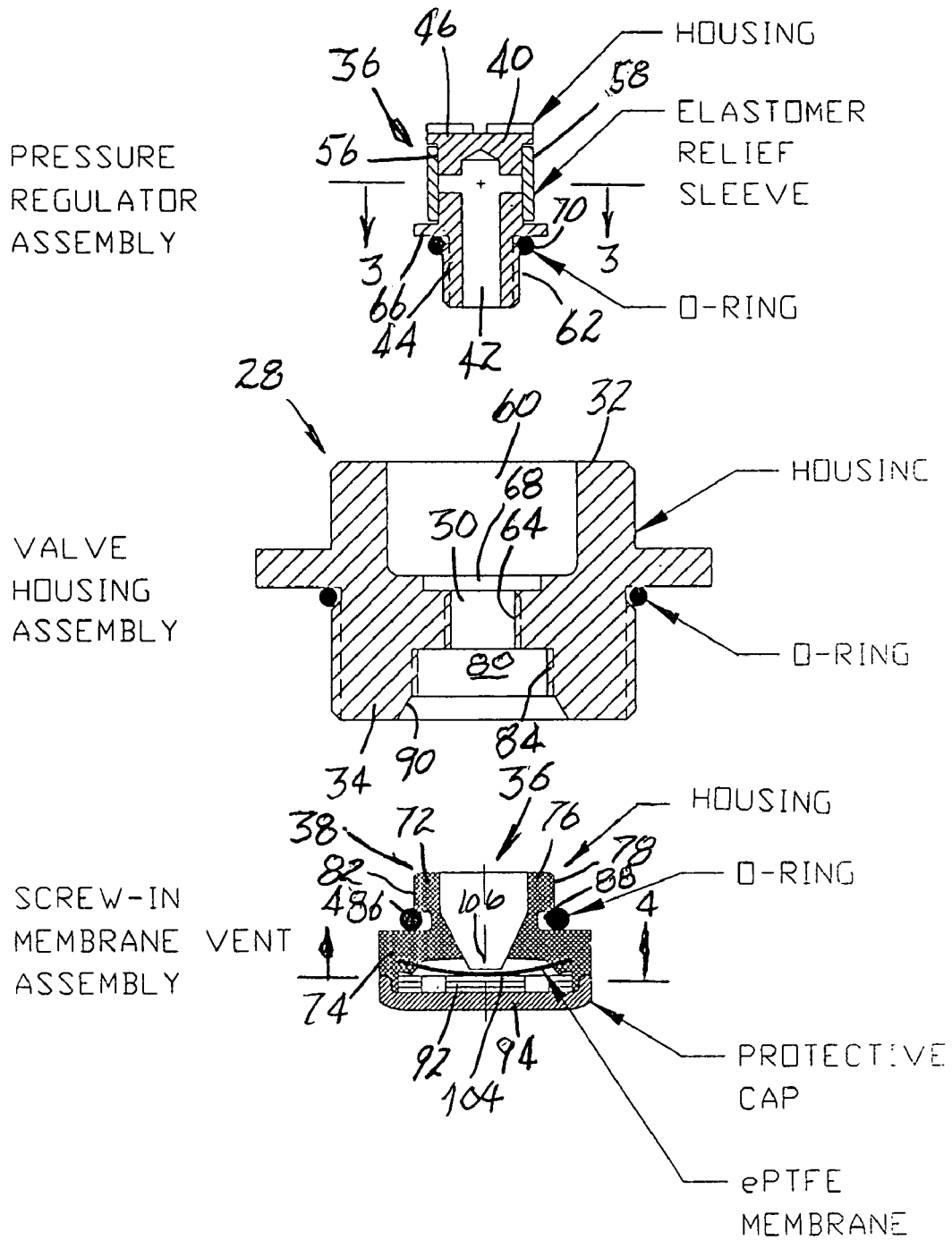
FIG. 2 is an exploded view of the liquid retaining pressure relief valve assembly shown in FIG. 1.
Figure 3:
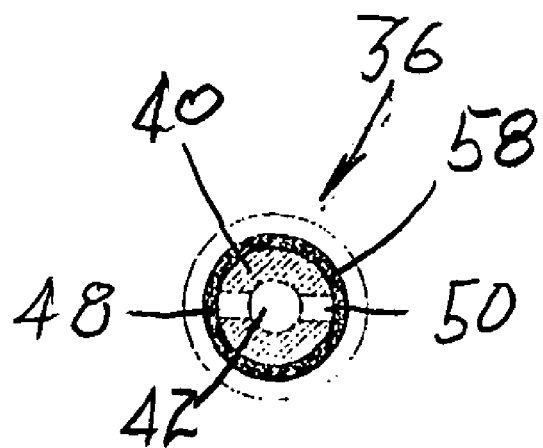
FIG. 3 is a plan view of the pressure regulator assembly taken along the line 3-3 in FIG. 2.
Figure 4:
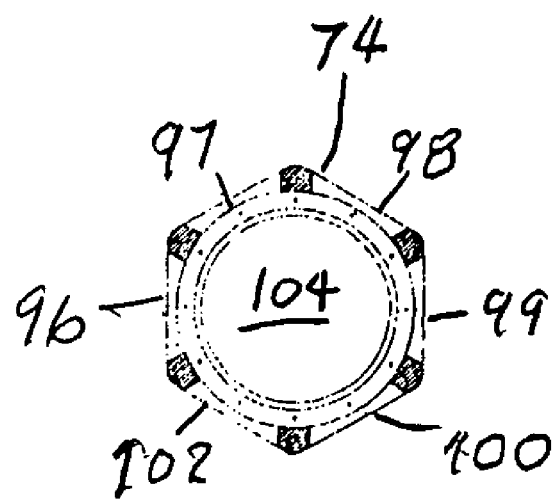
FIG. 4 is a plan view of the membrane vent assembly taken along the line 4-4 in FIG. 2.

As best shown in FIGS. 2-4, inclusive, the liquid retaining pressure relief valve 12 comprises a molded plastic valve housing 28 having a gas passageway 30 extending through the housing from its top to its bottom ends 32, 34, respectively.

The pressure relief valve 12 further includes a pressure regulator assembly 36 mounted within the top end 32 of the valve housing 28 and a membrane vent assembly 38 mounted within the bottom end 34 of the housing 28 as best shown in the view of FIG. 1.

The pressure regulator 36 is of a bladder type design and comprises an elongated cylindrical molded plastic body 40 including a central internal bore 42 extending from its lower end or stem 44 to nearly its top end 46. The bore 42 communicates near the top end of the body 40 with two radially outward disposed channels 48-50, respectively, (see FIG. 3) each one of which communicates with a shallow circumferential groove 56 on the outer cylindrical surface of the regulator body 40. An annular elastomer band or ring 58 is gas-tightly engaged within the groove 56 and seals off the two channels 48-50 during normal conditions when the internal gas pressure inside the battery cell is kept to a minimum.

The regulator body 40 is mounted inside an enlarged cylindrical cavity 60 forming the upper end portion of the gas passageway 30. The lower end portion or stem 44 on the regulator body 40 is provided with threads as at 62 for engaging a matching threaded portion 64 on the side walls of the gas passageway 30. A collar 66 is provided around the side walls of the regulator body 40 just above the stem 44. The collar 66 rests inside a shallow circular groove 68 formed at the bottom of the cavity 60, thus helping to align and secure the pressure regulator 36 in place within the valve housing 28. An O-ring 70 is provided beneath the collar 66 on the regulator body 40 to further assure a gas tight seal.

The membrane vent assembly 38 is of a generally inverted T-shaped design and includes a molded plastic hollow vent body 72. The vent body 72 has a larger diameter ring shaped lower section 74 and a smaller diameter ring shaped upper section 76, the latter forming a short tubular stem 78 for mounting the valve body 72 within a shallow recessed opening 80 at the lower end 34 of the valve housing 28. The outer surface of the tubular stem 78 is provided with threads as at 82 which engage with matching threads 84 on the interior side walls of the recessed opening 80. An O-ring 86 is placed partly inside an annular slot 88 provided around the lower end of the tubular stem 78 and engages with a fluted or beveled edge 90 surrounding the recessed opening 80, thus assuring a gas tight seal.

The larger diameter ring shaped lower section 74 of the vent body 72 forms a small shallow vent chamber 92 which is formed by a shallow cup shaped protective cap 94 fitted around the outer edges of the ring shaped lower section 74 of the vent body 72.

As shown more particularly in FIG. 4, the outer peripheral edge portion of the ring shaped lower section 74 is formed with a plurality of tiny slots or holes 96-102 for passage of gas into the vent 92. In the battery cell shown, six equally spaced apart radially disposed narrow slots 96-102 are employed.

A thin gas permeable electrolyte repellant membrane 104 is disposed across the upper portion of the vent chamber 92. The membrane 104 is located just below a V-shaped entrance 106 into the hollow tubular stem 78 and above the six tiny slots 96-102. The membrane 104 is circular in shape and has its outer peripheral edges molded in place within the interior wall portion of the lower ring shaped section 74.

During charge and discharge of the battery cell, gasses such as hydrogen and oxygen, are generated inside the sealed container or case 14. The gasses enter the vent chamber 92 under pressure through the plurality of slots 96-102 and pass through the gas permeable membrane 104 into the V-shaped opening 106 in the tubular stem 74. The gasses then pass through the gas passageway 30 in the valve housing 28 and thence into the pressure regulator 36. The gasses are then vented to the ambient atmosphere via the two channels 48, 50 when the internal pressure inside the regulator exceeds that pressure required to stretch or displace the elastomer band 58 enough to allow the gasses to escape.

The gasses entering the vent chamber 92 may at times carry along with them entrained liquid electrolyte from inside the battery cell. The liquid electrolyte, however, is precluded from passing through the gas permeable liquid repellant membrane 104 along with the gasses and therefore there is no leakage of electrolyte out of the battery cell through the pressure regulator assembly 36.

A number of gas permeable plastic membrane materials have been tried for use in the liquid retaining pressure relief valve of the invention. However, most gas diffusion membrane materials tested have thus far proven to be unacceptable for one reason or another, mainly because they were not sufficiently repellant to alkaline or acidic electrolyte solutions used in battery cells, except one material, namely, an expanded polytetraflouroethylene (ePTFE) polymer. This gas permeable polymer is manufactured by W.L. Gore and Associates of Elkton, Md. and has been found to be an excellent liquid repellant membrane material for use in the alkaline or acidic environments and thus suitable for use as a gas permeable electrolyte repellant membrane in accordance with the invention. Based on the results of test conducted with this material, it is postulated that other gas permeable membrane materials may be useful in the practice of the invention provided that they are substantially liquid repellant to alkaline and acidic solutions, exhibit a satisfactory gas permeability under pressures ranging from about 0.5 to about 2.5 psi across the membrane, be available in thicknesses ranging from about 3 to about 5 millimeters and be capable of withstanding the relatively high temperatures required for molding the gas permeable membrane inside the membrane vent of the invention.

Table I below lists the results of a series of tests conducted to determine the suitability of a number of available gas permeable membrane materials for use in the invention. The materials included polypropylene and both standard PTFE and expanded PTFE gas diffusion membranes made from discs and rods, the latter being cut or sliced to the appropriate thicknesses.

TABLE 1

| Sample | Vacuum Test | Upside Down Gravity | Top side-up Vacuum | Upside down Vacuum |
|---|---|---|---|---|
| 0.004 inch thick PTFE gas diffusion membrane manufactured by W. L. Gore | No air passage (failed) | | | |
| ⅛ inch thick polypropylene gas diffusion discs manufactured by Porex Products | 30 psi external 28 psi internal | Leaked (failed) | | |
| ⅛ inch thick PTFE gas diffusion disc manufactured by Porex Products | 30 psi external 28 psi internal | No leak | 30 psi external 28 psi internal | 30 psi external pulled electrolyte through sample (failed) |
| ¼ inch diameter porous PTFE rods manufactured by Porex Products. | Could not seal (failed) | | | |
| M12x1.5 Screw-in Vent | 30 psi external | No leak | 30 psi | 30 psi |

TABLE 1-continued

| Sample | Vacuum Test | Upside Down Gravity | Top side-up Vacuum | Upside down Vacuum |
|---|---|---|---|---|
| with ePTFE membrane by W. L. Gore | 28 psi internal | | external 28 psi internal | external did not pull electrolyte through sample (passed) |

In order to demonstrate the effectiveness of the invention, a silver-zinc alkaline battery cell employing a liquid retaining pressure relief valve with a gas permeable electrolyte electrolyte repellant membrane composed of expanded polytetraflouroethylene (ePTFE) similar to that shown in FIG. 1 was constructed and tested. The test set up entailed pulling a vacuum of a minimum 28 inches of mercury on the battery cell through the ePTFE membrane and measuring the internal vacuum prior to activating the cell with electrolyte and after each electrical charge and discharge. If the internal pressure remained within 5 inches Hg of the external vacuum, the membrane is considered to have passed the test. The open circuit voltage of the cell was measured before and after each charge and discharge cycle. The ampere-hour output was recorded for each charge and the ampere-hour output is recorded for each discharge.

The results of this experiment ARE shown in Table 2 below:

TABLE 1

Cell Functional Test

| | AH In/Out | OCV Volts | External Vacuum Inches of Hg | Internal Vacuum Inches of Hg |
|---|---|---|---|---|
| Pre Activation | — | — | 29.50 | 28.50 |
| Post Activation | — | 1.860 | 30.00 | 28.50 |
| 1st Discharge | 554.53 | 1.602 | 30.00 | 28.50 |
| 2nd Charge | 472.11 | 1.859 | 30.00 | 28.00 |
| 2nd Discharge @ −2° C. | 465.74 | 1.599 | 30.00 | 28.00 |
| 3rd Charge | 403.63 | 1.859 | 30.00 | 28.00 |
| 3rd Discharge @ 40° C. | 409.37 | 1.597 | 30.00 | 28.00 |
| 4th Charge | 472.15 | 1.860 | N/A | N/A |
| 4th Discharge @ RT | 471.67 | 1.601 | 30.00 | 28.00 |
| 5th Charge | 495.60 | 1.862 | N/A | N/A |
| 5th Discharge @ RT | 495.92 | 1.602 | 30.00 | 28.00 |
| 6th Charge | 499.62 | 1.862 | N/A | N/A |
| 6th Discharge @ RT | 497.96 | 1.602 | 30.00 | 28.00 |
| 7th Charge | 494.69 | 1.866 | N/A | N/A |
| 7th Discharge @ 80° C. | 488.74 | 1.584 | 29.50 | 27.50 |
| 8th Charge | 476.83 | 1.861 | N/A | N/A |
| 8th Discharge | 451.45 | 1.572 | 30.00 | 28.00 |

The results of the test show that a silver-zinc battery cell employing liquid retaining pressure relief valve equipped with an expanded polytetraflouroethylene (ePTFE) membrane will vent gasses containing mostly oxygen and hydrogen and prevent electrolyte expulsion from the battery cell for many electrical charge and discharge cycles over an extended period of time. This valve may also be used for electrochemical acidic battery cells as well.

What is claimed is:

1. A liquid retaining pressure relief valve for use in an electrochemical battery cell having a cell cover comprising, in combination:
   a valve housing including a gas passageway extending between opposite ends thereof;
   a pressure regulator assembly sealably mounted in one of said opposite ends of said valve housing, said pressure regulator assembly including
      a regulator body having a center bore communicating with at least one vent channel for venting gasses passing through said gas passageway to the ambient atmosphere, and
      an elastomer band covering said at least one venting channel and on an exterior surface of said regulator body; and
   a membrane vent assembly sealably mounted in the other opposite end of said valve housing which directs gasses into said gas passageway from the interior of said battery cell, said membrane vent assembly including
      a hollow vent body having a larger outer diameter ring shaped lower section and a smaller outer diameter ring shaped upper section mounted within said gas passageway of said valve housing,
      a cupped shaped cap mounted beneath said larger diameter lower section forming together with said larger diameter lower section a vent chamber communicating with said gas passageway in said valve housing and having a plurality of slots radially disposed around said vent chamber, and
      a gas permeable liquid repellant membrane extending entirely across said vent chamber and having its outer edges embedded and liquid tightly sealed within said vent body, said slots allowing gas to enter into said vent chamber while substantially restricting the passage of liquid.

2. The liquid retaining pressure relief valve according to claim 1, wherein said gas permeable liquid repellant membrane is composed of expanded polytetrafluoroethylene (ePTFE) polymer.

3. The liquid retaining pressure relief valve according to claim 1, wherein six slots are disposed around the outer periphery of said vent chamber.

4. The liquid retaining pressure relief valve according to claim 1, wherein said vent chamber is formed by a cupped shaped protective cap fitted over the open lower end of said vent body.

5. The liquid retaining pressure relief valve according to claim 1, wherein an inner diameter of an entrance of the upper section of the hollow vent body is greater than an inner diameter of an entrance of the lower section of the hollow vent body.

6. An electrochemical battery cell comprising, in combination:
   a cell container having a cover;
   at least one positive and negative electrode inside said cell container;
   a separator disposed between said positive and negative electrodes; and
   a liquid retaining pressure relief valve mounted within said cell cover;
   said pressure relief valve comprising:
      a valve housing having an upper end and a lower end, said lower end of said valve housing being exposed to the interior of the said cell container, said valve housing including a gas passageway extending between said upper and said lower ends thereof;
      a pressure regulator assembly sealably mounted in said upper end of said valve housing for venting gasses from inside said cell container, said pressure regulator assembly including a regulator body having a center bore communicating with at least one venting channel open to the ambient atmosphere and an elastomer band covering said venting channel on the exterior surface of said regulator body, and a membrane vent assembly sealably mounted in said lower end of said valve housing which directs gases into said gas passageway from the interior of said cell container, said membrane vent assembly including a hollow vent body with an open lower end and having a larger outer diameter ring shaped lower section and a smaller outer diameter ring shaped upper section mounted within said gas passageway of said valve housing, and a cupped shaped protective cap fitted over the open lower end of said hollow vent body, the cupped shaped protective cap forming together with said hollow vent body a vent chamber with a plurality of slots spaced around said vent chamber, and a gas permeable liquid repellant membrane extending entirely across said vent chamber and having its outer edges embedded and liquid tightly sealed within said vent body, said liquid repellant membrane allowing gas to pass through said membrane but substantially retaining any liquid electrolyte entering said vent chamber along with said gasses.

7. The electrochemical battery cell according to claim 6, wherein said gas permeable liquid repellant membrane is composed of expanded polytetrafluoroethylene (ePTFE) polymer.

8. The electrochemical battery cell according to claim 6, wherein said hollow vent body is formed in an invented T shape with the larger diameter section thereof forming said vent chamber together with said vent cap.

9. The electrochemical battery cell according to claim 6, wherein an inner diameter of an entrance of the upper section of the hollow vent body is greater than an inner diameter of an entrance of the lower section of the hollow vent body.

10. A liquid retaining pressure relief valve comprising:
a valve housing having a first end, an opposite second end, and a gas passageway extending from the first end to the second end;
a pressure regulator assembly mounted in the first end of the valve housing, the pressure regulator assembly comprising a body having a bore, a groove on an outer surface of the body, and a channel in fluid communication with the bore and the groove, and an elastomeric band on the groove; and a vent assembly mounted in the second end of the valve housing, the vent assembly comprising a vent body having
an upper section, and
a lower section comprising a plurality of slots, wherein
an outer diameter of the upper section is less than an outer diameter of the lower section, and
an inner diameter of an entrance of the upper section is greater than an inner diameter of an entrance of the lower section, a cap mounted to the lower section of the vent body, the cap and the vent body defining a vent chamber, and a gas permeable liquid repellant membrane disposed across the vent chamber and covering the entrance of the lower section.

11. The liquid retaining pressure relief valve of claim 10, wherein the plurality of slots are radially disposed on the lower section of the vent body.

12. The liquid retaining pressure relief valve of claim 10, wherein a periphery of the membrane is embedded in the lower section of the vent body.

13. The liquid retaining pressure relief valve of claim 10, wherein the body of the pressure regulator assembly further comprises a collar on the outer surface of the body and adjacent to the groove, and wherein the pressure regulator assembly further comprises an O-ring disposed adjacent to the collar on a side of the collar which opposite to the groove.

14. The liquid retaining pressure relief valve of claim 10, wherein the entrance of the lower section of the vent body has a frustoconical shape.

15. The liquid retaining pressure relief valve of claim 10, wherein the vent assembly further comprises an O-ring disposed between the upper section and the lower section of the vent body.

16. The liquid retaining pressure relief valve of claim 10, wherein the body of the pressure regulator further comprises a top end, which has an outer diameter which is greater than an outer diameter of the outer surface of the body.

17. A battery cell comprising the liquid retaining pressure relief valve of claim 10.

* * * * *